United States Patent
Wang et al.

(10) Patent No.: US 9,648,237 B2
(45) Date of Patent: May 9, 2017

(54) PORTABLE DEVICE AND MANIPULATION METHOD FOR TRIGGERING DIFFERENT FUNCTIONS WITH A MANIPULATION INPUT

(71) Applicant: HTC Corporation, Taoyuan (TW)

(72) Inventors: Yuan-Kang Wang, Taoyuan (TW); Wen-Chuan Lee, Taoyuan (TW); Wen-Chien Liu, Taoyuan (TW); Ko-Hsin Hsiang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/720,842

(22) Filed: May 25, 2015

(65) Prior Publication Data
US 2015/0358541 A1 Dec. 10, 2015

Related U.S. Application Data

(60) Provisional application No. 62/009,338, filed on Jun. 9, 2014.

(51) Int. Cl.
*H04N 5/222* (2006.01)
*H04N 5/232* (2006.01)
(Continued)

(52) U.S. Cl.
CPC ......... *H04N 5/23245* (2013.01); *G06F 3/011* (2013.01); *H04N 5/38* (2013.01); *H04N 5/772* (2013.01); *H04N 21/4223* (2013.01)

(58) Field of Classification Search
CPC ............. H04N 5/23216; H04N 5/2258; H04N 5/23245; H04N 5/23293; G06F 3/04842; G06F 3/04883; G06F 3/04886
See application file for complete search history.

(56) References Cited

U.S. PATENT DOCUMENTS 8,514,292 B2 * 8/2013 Cho .................. H04N 5/23245
348/207.99
2005/0093988 A1 * 5/2005 Haas ................. H04N 5/23245
348/220.1
(Continued)

FOREIGN PATENT DOCUMENTS

EP    1725024 A2    11/2006

OTHER PUBLICATIONS

Corresponding extended European Search Report that these art references were cited on Nov. 2, 2015.
(Continued)

*Primary Examiner* — Sinh Tran
*Assistant Examiner* — Selam Gebriel
(74) *Attorney, Agent, or Firm* — CKC & Partners Co., Ltd.

(57) ABSTRACT

A portable device and a manipulation method are disclosed. The portable device includes a camera unit, a first sensor and a control module. The camera unit has a plurality of functional modes. The functional modes include a photo-capturing mode and a video-recording mode. The first sensor is disposed on the portable device and configured for sensing a manipulation input. The manipulation input has a manipulation pattern and duration information of the manipulation pattern. The control module is coupled with the camera unit and the first sensor. The control module is configured for selecting one of the functional modes corresponding to the manipulation pattern and the duration information sensed by the first sensor, and triggering the camera unit into the selected functional mode.

18 Claims, 3 Drawing Sheets

(51) Int. Cl.
*G06F 3/01* (2006.01)
*H04N 5/38* (2006.01)
*H04N 21/4223* (2011.01)
*H04N 5/77* (2006.01)

(56) References Cited

U.S. PATENT DOCUMENTS

| | | | |
|---|---|---|---|
| 2006/0285843 A1 | 12/2006 | Sakurai | |
| 2010/0013778 A1* | 1/2010 | Liu | G06F 1/1626 345/173 |
| 2014/0055633 A1 | 2/2014 | Marlin et al. | |
| 2014/0168494 A1* | 6/2014 | Hong | G06F 1/3287 348/333.01 |

OTHER PUBLICATIONS

Y. Oyama and Y. Nakashima, "A Proposal of Obstacle Detection Technology Using the View-Aid System," Innovative Computing, Information and Control (ICICIC), 2009 Fourth International Conference on, Kumamoto National College of Technology, 2009, pp. 1240-1243.

M. Burri et al., "Design and control of a Spherical Omnidirectional Blimp" 2013 IEEE/RSJ International Conference on Intelligent Robots and Systems, Tokyo, Nov. 3-7, 2013, pp. 1873-1879.

Corresponding Taiwanese Office Action that these art references were cited on Aug. 5, 2016.

* cited by examiner

PORTABLE DEVICE AND MANIPULATION METHOD FOR TRIGGERING DIFFERENT FUNCTIONS WITH A MANIPULATION INPUT

CROSS-REFERENCE TO RELATED APPLICATION

This application claims the priority benefit of U.S. Provisional Application Ser. No. 62/009,338, filed Jun. 9, 2014, the full disclosure of which is incorporated herein by reference.

FIELD OF INVENTION

The invention relates to a manipulation method. More particularly, the invention relates to a manipulation method of selecting between different functional modes according to a manipulation input.

BACKGROUND

In order to increase mobility of electronic devices, designers are challenged to figure out how to reduce sizes and weights of the electronic devices. On a portable device, the size is a critical issue for the designer. A portable device (e.g., smart phones, digital cameras, sports cameras, tablets, or similar handheld devices) has less space for disposing buttons for different functions.

If the portable device has ten different functions and each of the functions requires an individual button to manipulate (e.g., trigger, control, configure, etc), the portable device must has at least ten individual buttons. In this case, each of the ten buttons will be small, hard to locate and easy to be damaged. On the other hand, the size of the portable device must be enlarged for accommodating these buttons. It is a dilemma between increasing the mobility or the maneuverability of the portable device. However, the cutting-edge portable device must be capable to fulfill many functions within a compact size.

SUMMARY

An embodiment of this disclosure is to provide a portable device, which is capable of performing multiple functions with a multi-purpose input sensor (e.g., button, key, switch, etc). The manipulation input sensed by the input sensor is analyzed and configured for triggering different functions of the portable device.

An aspect of the disclosure is to provide a portable device, which includes a camera unit, a first sensor and a control module. The camera unit has a plurality of functional modes. The functional modes include a photo-capturing mode and a video-recording mode. The first sensor is disposed on the portable device and configured for sensing a manipulation input. The manipulation input has a manipulation pattern and duration information of aforesaid manipulation pattern. The control module is coupled with the camera unit and the first sensor. The control module is configured for selecting one of the functional modes according to the manipulation pattern and the duration information sensed by the first sensor, and triggering the camera unit into the selected functional mode.

Another aspect of the disclosure is to provide a manipulation method, which is suitable for the portable device includes a camera unit. The camera unit has a plurality of functional modes including a photo-capturing mode and a video-recording mode. The manipulation method includes steps of: sensing a manipulation input; extracting a manipulation pattern and duration information of aforesaid manipulation pattern from the manipulation input; selecting one of the functional modes corresponding to the manipulation input according to the manipulation pattern and the duration information; and, triggering the camera unit into the selected functional mode.

Another aspect of the disclosure is to provide a non-transitory computer readable storage medium with a computer program to execute aforesaid manipulation method.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
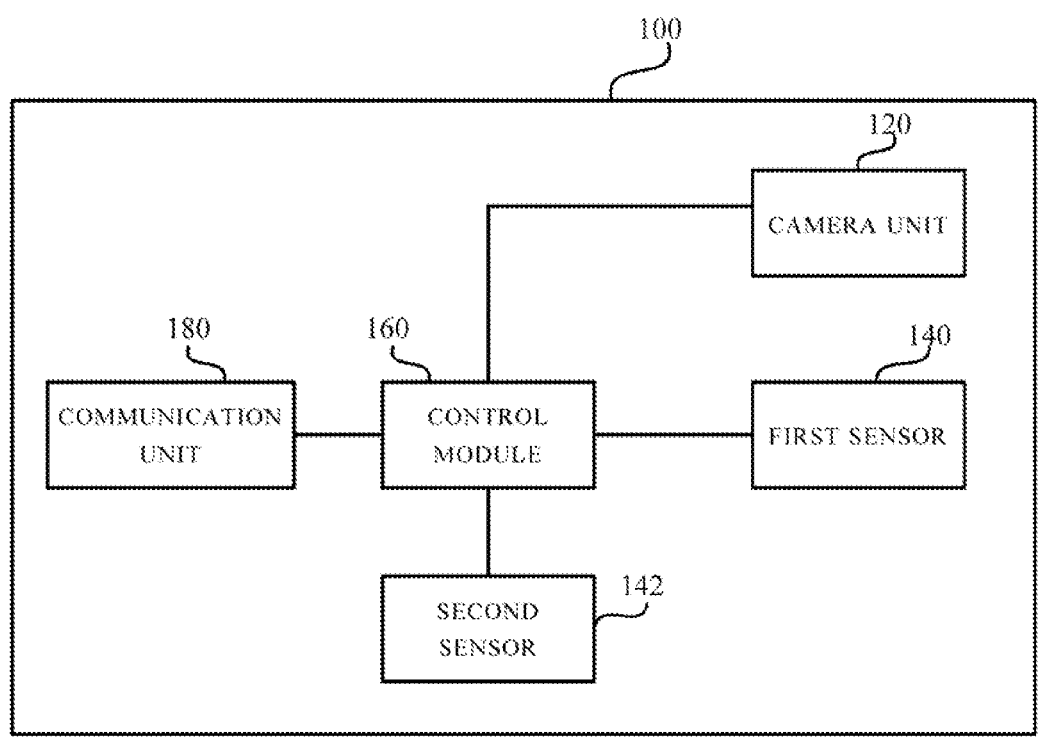
FIG. 1 is a schematic diagram illustrating a portable device 100 according to an embodiment of this disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a schematic diagram illustrating a portable device 100 according to an embodiment of this disclosure. As shown in FIG. 1, the portable device 100 includes a camera unit 120, a first sensor 140 and a control module 160. In practices, the portable device 100 can be a sports camera, a versatile camera, a smart phone, a digital camera, a tablet, or a similar handheld device.

In practical applications, the camera unit 120 of the portable device 100 includes lens, an optical sensor component, a focusing motor and/or a digital signal processor (DSP) for processing an image or a video captured by the camera unit 120. Aforesaid structures of the camera unit 120 is well known by a person in the art and not further discussed here.

In the embodiment, the camera unit 120 has several functional modes. The functional modes at least include a photo-capturing mode and a video-recording mode. When the camera unit 120 is operated under the photo-capturing mode, the camera unit 120 is able to capture a photograph in response to a photo-shooting command (e.g., a manipulation input from the user). When the camera unit 120 is operated under the video-recording mode, the camera unit 120 is able to record a video in response to a video-recording command (e.g., another manipulation input from the user).

Furthermore, the camera unit 120 is not limited to aforesaid two functional modes. For example, the camera unit 120 may further have a burst-capturing mode, which is utilized to capture a series of photographs in sequence; and, the camera unit 120 may further have a broadcasting mode, which is utilized to live broadcasting a streaming video recorded by the camera unit 120. In some embodiments, the portable device 100 further includes a communication unit 180 for exchanging information with at least one external terminal (e.g., a server of Youtube, Twitch, HTC ZOE, or any equivalent streaming video terminal). The streaming video recorded by the camera unit 120 can be transmitted to the external terminal.

On a conventional device, there might be different buttons (e.g., a shutter button and a recording button) for generating the single-shooting command and the video-recording command individually. However, it is hard to find enough space to dispose all these buttons on the portable device 100 for each of the functions.

In some embodiment, the first sensor 140 is a switch button disposed on the portable device 100. The switch button can be manipulates by a user (e.g., click, double click, press down, press and hold, etc). Based on how the user manipulates the switch, the first sensor 140 will generate a corresponding manipulation input. The first sensor 140 is utilized to generate different commands (e.g., the photo-shooting command, the video-recording command, etc), for triggering the camera unit 120 into different functional modes with only one switch button.

The manipulation input generated by the first sensor 140 has a manipulation pattern and duration information of aforesaid manipulation pattern. In this embodiment, the manipulation pattern is related to a behavior, a count, a distribution about how the user manipulates the switch button (e.g., the user clicks the switch button once, the user clicks the switch button several times in a row, the user presses the switch button down and holds the switch button). The duration information of the manipulation pattern is related to how long the switch button has been pressed down. In some embodiments, the duration information is counted separately for each time the switch button is pressed.

The control module 160 is coupled with the camera unit 120 and the first sensor 140. The control module 160 is configured for selecting one of the functional modes according to the manipulation pattern and the duration information sensed by the first sensor, and triggering the camera unit into the selected functional mode. In practices, the control module 160 is a processor, a central processing unit, a control integrated chip, or a System-on-Chip (SoC) for executing some programs/instructions, performing computations and/or managing some processes of the portable device 100.

In some embodiments, the portable device 100 further includes a second sensor 142. The second sensor 142 is disposed on the portable device 100. In some embodiments, the second sensor 142 is a pressure sensor and configured for sensing a pressure value on a surface of the portable device 100. The control module 160 is further coupled with the second sensor 142 and configured for determining whether the portable device 100 is gripped by the user. The first sensor 140 is deactivated in response to the portable device 100 is not gripped by the user.

Reference is made to FIG. 2 to FIG. 5, which are schematic diagrams illustrating the manipulation input MP1/MP2/MP3/MP4 sensed by the first sensor 140 in four different examples according to the embodiment.

Figure 2:
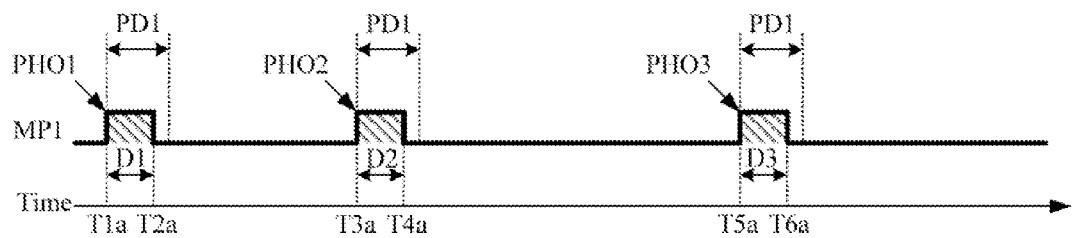
FIG. 2 to FIG. 5 are schematic diagrams illustrating the manipulation input sensed by the first sensor in four different examples according to the embodiment.
Figure 3:
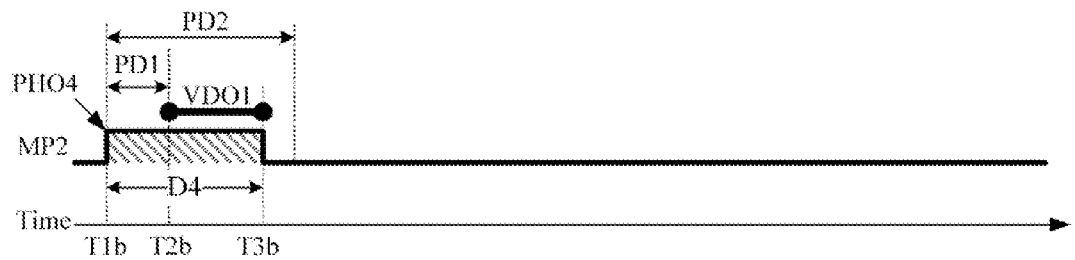

As shown in FIG. 2, the first sensor 120 generates the manipulation input MP1, which indicates that the switch button is pressed down (at the time point T1a) and then released (at the time point T2a) within a first predetermined duration PD1. The first predetermined duration is utilized as a reference to identify the manipulation pattern of the manipulation input MP1~MP4. The first predetermined duration PD1 in the example is about 1 second for demonstration, and not limited to 1 second.

The press-and-hold duration D1 between the time points T1a and T2a is shorter than the first predetermined duration PD1. Therefore, the manipulation pattern of the manipulation input MP1 corresponding to the press-and-hold duration D1 is regarded as a "click" pattern. In this case, the photo-capturing mode is selected by the control module 160, and the camera unit 120 is triggered to capture a photo PHO1 corresponding to the press-and-hold duration D1. For example, the photo PHO1 can be pre-captured at time point T1a (at the moment when the switch button is just pressed), or the photo PHO1 can be captured at time point T2a (right after the switch button is just released).

As shown in FIG. 2, the switch button is pressed down again (at the time point T3a) and then released again (at the time point T4a) within the first predetermined duration PD1. The press-and-hold duration D2 between the time points T3a and T4a is also shorter than the first predetermined duration PD1. Therefore, the manipulation pattern of the manipulation input MP1 corresponding to the press-and-hold duration D2 is also regarded as another "click" pattern. In this case, the photo-capturing mode is selected by the control module 160, and the camera unit 120 is triggered to capture another photo PHO2 corresponding to the press-and-hold duration D2. For example, the photo PHO2 can be captured at time point T3a or T4a.

Afterward, the switch button is pressed down again (at the time point T5a) and then released again (at the time point T6a) within the first predetermined duration PD1. The manipulation pattern of the manipulation input MP1 corresponding to the press-and-hold duration D3 (between T5a and T6a) is also regarded as another "click" pattern. In this case, the photo-capturing mode is selected by the control module 160, and the camera unit 120 is triggered to capture another photo corresponding to the press-and-hold duration D3. For example, the photo PHO3 can be captured at time point T5a or T6a.

In summary, if the manipulation input MP1 includes any press-and-hold duration D1/D2/D3 shorter than the first predetermined duration PD1, the press-and-hold duration D1/D2/D3 will be viewed as a "click" pattern. In response to one "click" pattern, the camera unit 120 is triggered to capture one photo PHO1/PHO2/PHO3.

On the other hand, if the switch button is pressed and held over the first predetermined duration PD1, the video-recording mode is selected by the control module 140, and the camera unit 120 is triggered into the video-recording mode for recording a video VDO1 in response to the manipulation input. As the embodiment shown in FIG. 3, the first sensor 120 generates the manipulation input MP2, which indicates that the switch button is pressed down (at the time point T1b), held over the first predetermined duration PD1, and then released (at the time point T3b) within a second predetermined duration PD2. The second predetermined duration PD2 is longer than the first predetermined duration PD1. The second predetermined duration PD2 is also utilized as a reference to identify the manipulation pattern of the manipulation input MP1~MP4. The second predetermined duration PD2 in the example is about 3 seconds for demonstration, and not limited to 3 seconds.

The press-and-hold duration D4 between the time points T1b and T3b is longer than the first predetermined duration PD1 and shorter than the second predetermined duration PD2. The manipulation pattern of the manipulation input MP2 corresponding to the press-and-hold duration D4 is regarded as a "short-press" pattern. In this case, the video-recording mode is selected by the control module 160, and the camera unit 120 is triggered to record the video VDO1 started from the time point T2b (at the moment when the switch button is pressed and held after the predetermined duration PD1). The video-recording mode of the camera unit 120 is stopped when the switch button is released (at the time point T3b). In some embodiments, based on the manipulation input MP2, a photo PHO4 is captured by the camera unit 120 at the time point T1b in addition to the video VDO1.

Figure 4:
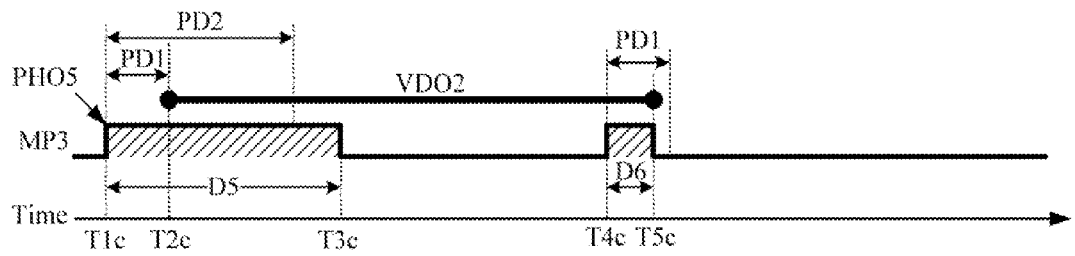

As the embodiment shown in FIG. 4, the first sensor 120 generates the manipulation input MP3, which indicates that the switch button is pressed down (at the time point T1c), held over the first predetermined duration PD1 and the second predetermined duration PD2, and then released at the time point T3c.

The press-and-hold duration D5 between the time points T1c and T3c is longer than the first predetermined duration PD1 and the second predetermined duration PD2. The manipulation pattern of the manipulation input MP3 corresponding to the press-and-hold duration D5 is regarded as a "long-press" pattern. In this case, the video-recording mode is selected by the control module 160, and the camera unit 120 is triggered to record the video VDO2 started from the time point T2b (at the moment when the switch button is pressed and held after the predetermined duration PD1). The camera unit 120 is locked (e.g., continuously operated) in the video-recording mode and keeps on recording the video VDO2.

In addition, the manipulation input MP3 further indicates that the switch button is pressed down (at the time point T4c) and released within the first predetermined duration PD1 (at the time point T5c). The press-and-hold duration D6 between the time points T4c and T5c is shorter than the first predetermined duration PD1. The manipulation pattern of the manipulation input MP3 corresponding to the press-and-hold duration D6 is regarded as a "click" pattern. In the embodiment show in FIG. 4, the video-recording mode of the camera unit 120 is stopped when the switch button is released (at the time point T5c) corresponding to the "click" pattern.

In other words, the "long-press" pattern of the manipulation input MP3 is configured to trigger the camera unit 120 into the video-recording mode, and the camera unit 120 is locked in the video-recording mode until the "click" pattern of the manipulation input MP3. In some embodiments, based on the manipulation input MP3, a photo PHO5 is captured by the camera unit 120 at the time point T1c in addition to the video VDO2.

Figure 5:
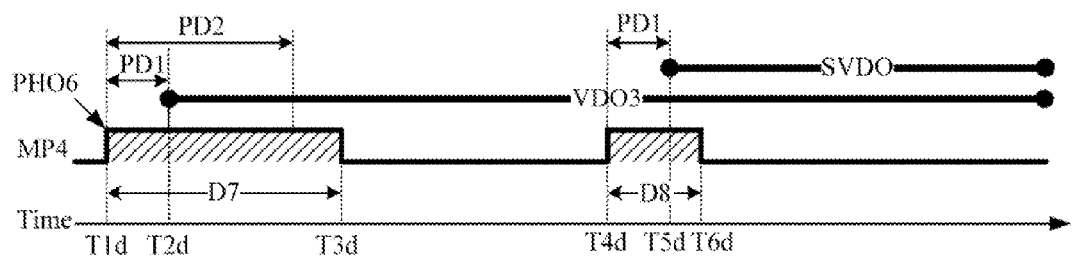

As the embodiment shown in FIG. 5, the first sensor 120 generates the manipulation input MP4, which indicates that the switch button is pressed down (at the time point T1d), held over the first predetermined duration PD1 and the second predetermined duration PD2, and then released at the time point T3d.

The press-and-hold duration D7 between the time points T1d and T3d is longer than the first predetermined duration PD1 and the second predetermined duration PD2. The manipulation pattern of the manipulation input MP4 corresponding to the press-and-hold duration D7 is regarded as a "long-press" pattern. In this case, the video-recording mode is selected by the control module 160, and the camera unit 120 is triggered to record the video VDO3 started from the time point T2d (at the moment when the switch button is pressed and held after the predetermined duration PD1). The camera unit 120 is locked in the video-recording mode and keeps on recording the video VDO3.

In addition, the manipulation input MP4 further indicates that the switch button is pressed down (at the time point T4d) and held over the first predetermined duration PD1. The press-and-hold duration D8 between the time points T4d and T6d is longer than the first predetermined duration PD1 and regarded as a "short-press" pattern. In the embodiment show in FIG. 5, the camera unit 120 is triggered into a broadcasting mode and the portable device 100 broadcasts a streaming video SVDO currently recorded by the camera unit 120 (started from the time point TSd). The streaming video SVDO is transmitted to the at least one external terminal (a server of Youtube, Twitch, HTC ZOE, or any equivalent streaming video terminal) through the communication unit 180.

Aforesaid embodiments shown in FIG. 2, FIG. 3, FIG. 4 and FIG. 5 demonstrate an example about how to activate/trigger multiple functions (including a photo-capturing, a video-recording, a stream-broadcasting, etc) with one switch button (i.e., the first sensor 140). However, this disclosure is not limited to the relationship between the manipulation patterns and the functions as the embodiments shown in FIG. 2 to FIG. 5, and any equivalent configurations are also possible to manipulate even more functions with one switch buttons according to different manipulation patterns (a combination of click, double click, soft press, hard press, short press and/or long press).

Figure 6:
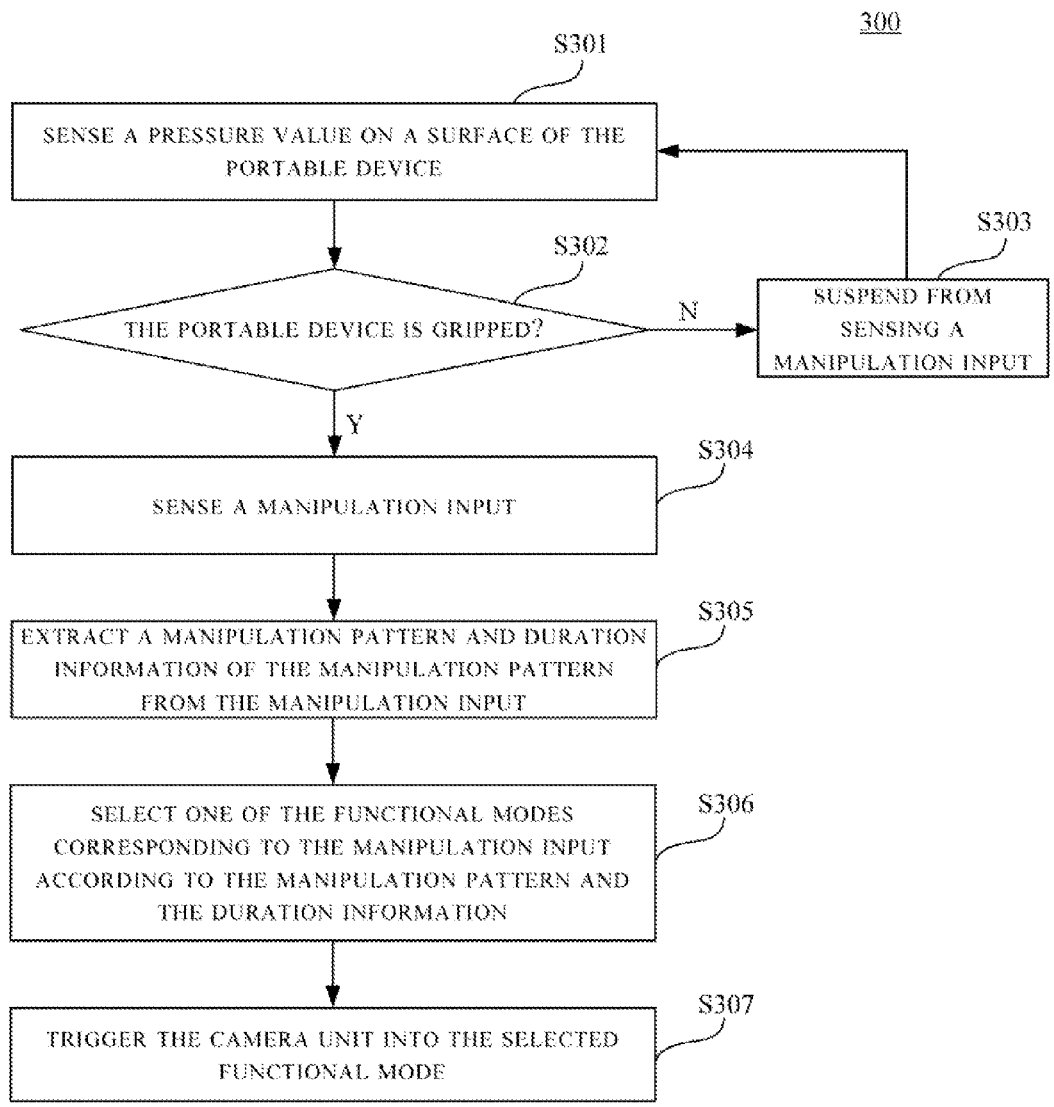
FIG. 6 is a flow chart diagram illustrating a manipulation method according to an embodiment of the disclosure.

Reference is also made to FIG. 6, which is a flow chart diagram illustrating a manipulation method 300 according to an embodiment of the disclosure. The manipulation method 300 is suitable to be utilized on the portable device 100 as disclosed in aforesaid embodiments.

As shown in FIG. 6, the manipulation method 300 executes step S304 for sensing a manipulation input (by the first sensor 140 shown in FIG. 1). Step S305 is executed for extracting a manipulation pattern and duration information of the manipulation pattern from the manipulation input. Step S306 is executed for selecting one of the functional modes corresponding to the manipulation input according to the manipulation pattern and the duration information. Details about the manipulation pattern, the duration information and how to select the functional mode accordingly (about steps S306 and S307) are disclosed in aforesaid embodiments and examples related to FIG. 2 to FIG. 5. Therefore, it is not repeated here. Step S307 is executed for triggering the camera unit 120 into the selected functional mode.

As shown in FIG. 6, before steps S304~S307, the manipulation method 300 further executes step S301 for sensing a pressure value on a surface of the portable device (by the second sensor 142 as shown in FIG. 1). Step S302 is executed for determining whether the portable device is gripped according to the pressure value. If the pressure value indicated that the portable device is gripped by the user, then step S304 is activated to sense the manipulation input by the first sensor 140. On the other hand, if the pressure value indicated that the portable device is not gripped by the user, step S303 is executed for suspending from sensing the manipulation input in response to the portable device 100 is not gripped. Therefore, the portable device 100 is configured into a standby mode when the portable device 100 is not gripped by the user, and the first sensor 140 is suspended from updating the sensing result of the manipulation input, so as to reduce the power consumption of the first sensor 140. Only when the portable device 100 is gripped by the user, the first sensor 140 is activated to provide the manipulation input.

Another embodiment of the disclosure is to provide a non-transitory computer readable storage medium with a computer program to execute aforesaid manipulation method 300 as shown in FIG. 6.

Based on aforesaid embodiments, this disclosure is to provide a portable device, a manipulation method and a non-transitory computer readable storage medium, which are capable of performing multiple functions with a multi-purpose input sensor (e.g., button, key, switch, etc). The manipulation input sensed by the input sensor is analyzed and configured for triggering different functions of the portable device. Therefore, the portable device is able to perform as many functions as possible with fewer switch buttons or functional keys, such that the portable device can be light weighted and compact sized without cutting off functions.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A portable device, comprising:
   a camera unit having a plurality of functional modes, the functional modes comprising a photo-capturing mode and a video-recording mode;
   a first sensor, disposed on the portable device and configured for sensing a manipulation input, the manipulation input having a manipulation pattern and duration information of the manipulation pattern;
   a control module, coupled with the camera unit and the first sensor, the control module being configured for selecting one of the functional modes according to the manipulation pattern and the duration information sensed by the first sensor, and triggering the camera unit into the selected functional mode,
   wherein the first sensor is a switch button, in response to the switch button is pressed, held over a first predetermined duration and released after a second predetermined duration, the camera unit is locked in the video-recording mode until the switch button is pressed again and then duration is longer than the first predetermined duration.

2. The portable device of claim 1, further comprising:
   a second sensor, disposed on the portable device and configured for sensing a pressure value on a surface of the portable device,
   wherein the control module is further coupled with the second sensor and configured for determining whether the portable device is gripped, the first sensor is deactivated in response to the portable device is not gripped.

3. The portable device of claim 1, wherein in response to the switch button is pressed and then released within the first predetermined duration, the photo-capturing mode is selected, and the camera unit is triggered to capture a photo corresponding to each time the switch button is pressed.

4. The portable device of claim 3, wherein, in response to the switch button is pressed and held over the first predetermined duration, the video-recording mode is selected and the camera unit is triggered into the video-recording mode.

5. The portable device of claim 4, wherein, in response to the switch button is pressed, held over the first predetermined duration and released within the second predetermined duration, the video-recording mode is stopped when the switch button is released.

6. The portable device of claim 1, wherein the portable device further comprises a communication unit for exchanging information with at least one external terminal, the functional modes further comprises a broadcasting mode, while the camera unit is locked in the video-recording mode, in response to the switch button is pressed again and held over the first predetermined duration, the camera unit is triggered into the broadcasting mode and the portable device broadcasts a streaming video currently recorded by the camera unit to the at least one external terminal through the communication unit.

7. A manipulation method, suitable for the portable device comprising a camera unit, the camera unit having a plurality of functional modes comprising a photo-capturing mode and a video-recording mode, the manipulation method comprising:
   sensing a manipulation input by a switch button;
   extracting a manipulation pattern and duration information of the manipulation pattern from the manipulation input;
   selecting one of the functional modes corresponding to the manipulation input according to the manipulation pattern and the duration information;
   triggering the camera unit into the selected functional mode; and
   in response to the switch button is pressed, held over a first predetermined duration and released after a second predetermined duration, locking the camera unit in the video-recording mode until the switch button is pressed again and then released within the first predetermined duration, the second predetermined duration being than the first predetermined duration.

8. The manipulation method of claim 7, further comprising:
   sensing a pressure value on a surface of the portable device;
   determining whether the portable device is gripped according to the pressure value; and
   suspending from sensing the manipulation input in response to the portable device is not gripped.

9. The manipulation method of claim 7, wherein in response to the switch button is pressed and then released within the first predetermined duration, the manipulation method further comprising:

selecting the photo-capturing mode; and triggering the camera unit to capture a photo corresponding to each time the switch button is pressed.

10. The manipulation method of claim 9, wherein, in response to the switch button is pressed and held over the first predetermined duration, the manipulation method further comprising:

selecting the video-recording mode; and triggering the camera unit into the video-recording mode.

11. The manipulation method of claim 10, wherein, in response to the switch button is pressed, held over the first predetermined duration and released within the second predetermined duration, the manipulation method further comprising:

terminating the video-recording mode when the switch button is released.

12. The manipulation method of claim 7, wherein the functional modes further comprises a broadcasting mode, while the camera unit is locked in the video-recording mode, in response to the switch button is pressed again and held over the first predetermined duration, the manipulation method further comprising:

triggering the camera unit into the broadcasting mode;

broadcasting a streaming video currently recorded by the camera unit to at least one external terminal.

13. A non-transitory computer readable storage medium storing one or more programs, the one or more programs comprising instructions that, when executed by a processor of a portable device with a camera unit, causes the portable device to perform a manipulation method, wherein the manipulation method comprises:

sensing a manipulation input by a switch button;

extracting a manipulation pattern and duration information of the manipulation pattern from the manipulation input;

selecting one functional mode corresponding to the manipulation input from a plurality of functional modes of the camera unit according to the manipulation pattern and the duration information;

triggering the camera unit into the selected functional mode; and in response to the switch button is pressed, held over a first predetermined duration and released after a second predetermined duration, locking the camera unit in the video-recording mode until the switch button is pressed again and then released within the first predetermined duration, the second predetermined duration being longer than the first predetermined duration.

14. The non-transitory computer readable storage medium of claim 13, wherein the manipulation method further comprises:

sensing a pressure value on a surface of the portable device;

determining whether the portable device is gripped according to the pressure value; and suspending from sensing the manipulation input in response to the portable device is not gripped.

15. The non-transitory computer readable storage medium of claim 13, wherein in response to the switch button is pressed and then released within the first predetermined duration, the manipulation method further comprising:

selecting a photo-capturing mode from the functional modes; and triggering the camera unit to capture a photo corresponding to each time the switch button is pressed.

16. The non-transitory computer readable storage medium of claim 15, wherein, in response to the switch button is pressed and held over the first predetermined duration, the manipulation method further comprising:

selecting a video-recording mode from the functional modes; and triggering the camera unit into the video-recording mode.

17. The non-transitory computer readable storage medium of claim 16, wherein, in response to the switch button is pressed, held over the first predetermined duration and released within the second predetermined duration, the manipulation method further comprising:

terminating the video-recording mode when the switch button is released.

18. The non-transitory computer readable storage medium of claim 13, wherein the functional modes further comprises a broadcasting mode, while the camera unit is locked in the video-recording mode, in response to the switch button is pressed again and held over the first predetermined duration, the manipulation method further comprising:

triggering the camera unit into the broadcasting mode;

broadcasting a streaming video currently recorded by the camera unit to at least one external terminal.

* * * * *